Sept. 15, 1970  J. W. GIFFEN  3,528,791
METHOD OF MANUFACTURING NONPOROUS VITREOUS BUILDING TILE
Original Filed Nov. 22, 1967  2 Sheets-Sheet 1

INVENTOR.
JAMES W. GIFFEN
BY
*Burton R. Turner*
ATTORNEY

Sept. 15, 1970    J. W. GIFFEN    3,528,791
METHOD OF MANUFACTURING NONPOROUS VITREOUS BUILDING TILE
Original Filed Nov. 22, 1967    2 Sheets-Sheet 2

INVENTOR.
JAMES W. GIFFEN
BY
ATTORNEY

United States Patent Office 3,528,791
Patented Sept. 15, 1970

3,528,791
METHOD OF MANUFACTURING NONPOROUS VITREOUS BUILDING TILE
James W. Giffen, Corning, N.Y., assignor to Corning Glass Works, Corning, N.Y., a corporation of New York
Original application Nov. 22, 1967, Ser. No. 685,044. Divided and this application June 10, 1969, Ser. No. 843,886
Int. Cl. C03b 23/02
U.S. Cl. 65—67    5 Claims

ABSTRACT OF THE DISCLOSURE

Nonporous vitreous wall cladding tile having an integral peripheral undercut attachment flange is produced by first vacuum-forming the tile to a desired shape from molten or plastic sheet of vitreous material, and then, while the vitreous material is still in a molten or plastic state, trimming the article from the sheet to form an inwardly-extending peripheral flange providing a locking undercut recess of reverse angle.

---

This is a division of application Ser. No. 685,044; filed Nov. 22, 1967, now abandoned.

BACKGROUND OF THE INVENTION

In the past it has been customary to manufacture cladding tile from a porous ceramic material which is laid up in the normal manner with mason's mud or mortar. However, many building codes, particularly in the northern climates, do not allow the utilization of porous exterior cladding due to the fact that the porous material absorbs moisture and with subsequent freezing and thawing it has a tendency to spall and eventually break loose from its mounting. The present invention alleviates the problems of spalling and adhesion failure occasioned by the known porous ceramic cladding tile, with a two-fold approach, which not only includes the utilization of a nonporous vitreous material, but also the incorporation of an integral peripheral lock attachment flange having a recessed undercut which securely mechanically locks the laid up tile to the mud or mortar.

SUMMARY OF THE INVENTION

The improved nonporous vitreous tile of the present invention is preferably produced by vacuum-forming sheet glass. A sheet of molten or semi-molten glass is applied to a suitable vacuum mold, and a vacuum is applied to the cavity of the mold to draw the thermal plastic sheet downwardly into the form of the contour of the mold cavity. Any desired exterior configuration can, of course, be formed on the tile merely by the design or shape of the mold cavity utilized. After the article is formed from the heat-softened sheet it is necessary that it be trimmed from the remainder of the sheet overlying bounding surfaces of the mold, before the glass has had an opportunity to fully set. That is, the trimming operation must be performed while the glass is still in a plastic or semi-plastic state so as to facilitate the formation of the desired undercut locking flange while avoiding fissures and cracks.

A novel trimming arrangement, which includes a female vacuum mold and a male trimmer, produces the peripheral flange with a desired undercut or reverse angle which provides an integral mechanical locking feature. After a sheet of glass is vacuum-formed within the female mold, but while still in a thermal plastic state, the trimmer moves downwardly into engagement with the glass adjacent the periphery of the mold and forces this initially-contacted glass downwardly and inwardly toward the center of the mold cavity. As the trimmer continues its downward movement, it passes through that area which would be equivalent to the thickness of the glass and stops adjacent the trimmer edge of the female mold, thus completing the trimming operation while simultaneously completing the formation of a peripheral flange having a reverse angle due to the excess glass which has been pushed downwardly and somewhat inwardly of the outer periphery by the male trimmer.

Although the porous ceramic cladding tile did provide a porous surface which readily attached to the mortar, it was impossible to provide such tile with an undercut or reverse angle attachment as achieved with the present invention. That is, the manufacture of porous ceramic tile required a two-face molding operation, which necessitated a positive draft, and accordingly a reentrant locking angle could not be provided.

It thus has been an object of the present invention to provide a new vitreous cladding tile having a unique integral mechanical locking feature, and also an improved method of so-forming such tile.

BRIEF DESCRIPTION OF THE DRAWINGS

FIG. 1 shows a sheet of thermal plastic vitreous material laid over a female mold and vacuum-formed in the cavity thereof, with a male trimmer in an inoperative position.

FIG. 2 shows the male trimmer in its initial contact with the sheet glass adjacent the periphery of the newly vacuum-formed article.

FIG. 3 shows the male trimmer in its final position adjacent the trimming edge of the female mold with the article therewithin severed from the remainder of the sheet, and the excess glass pushed inwardly to form a peripheral locking flange with a recessed undercut.

DESCRIPTION OF THE PREFERRED EMBODIMENTS

Figure 1:
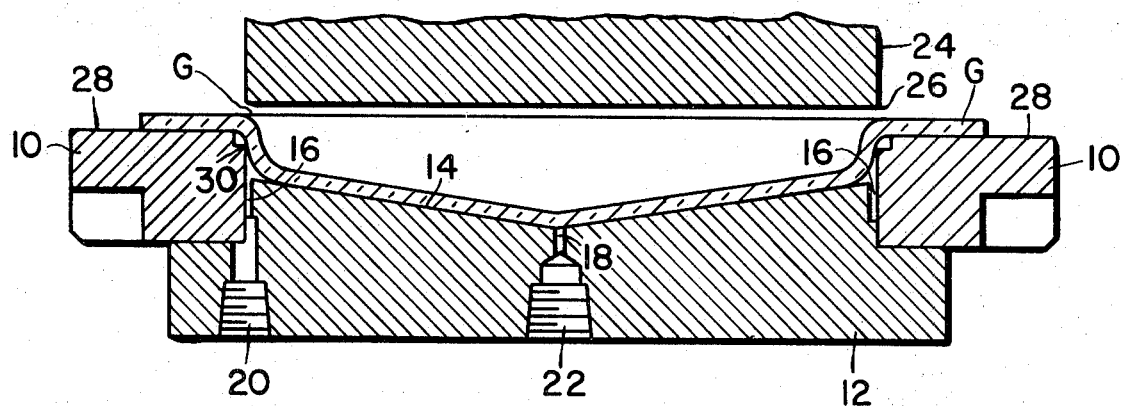
FIGS. 1, 2 and 3 are somewhat schematic side elevational views in section showing a sequence of operating steps utilized to form the improved tile structure of the present invention.
Figure 2:
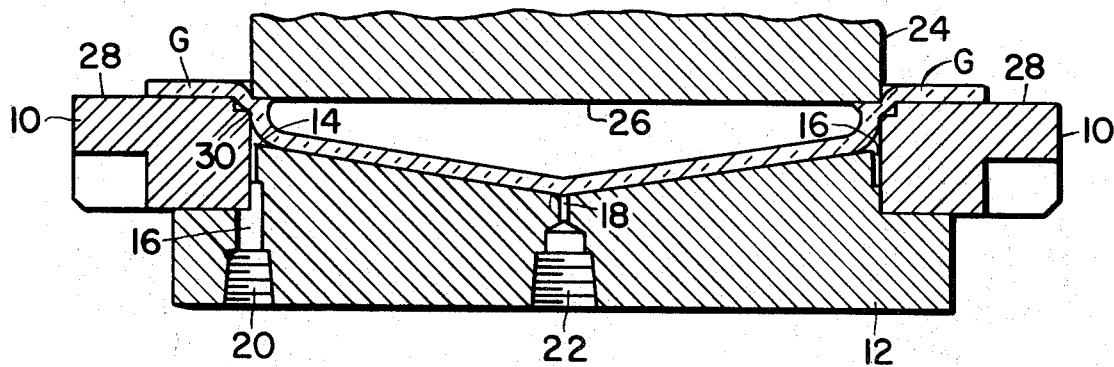
Figure 3:
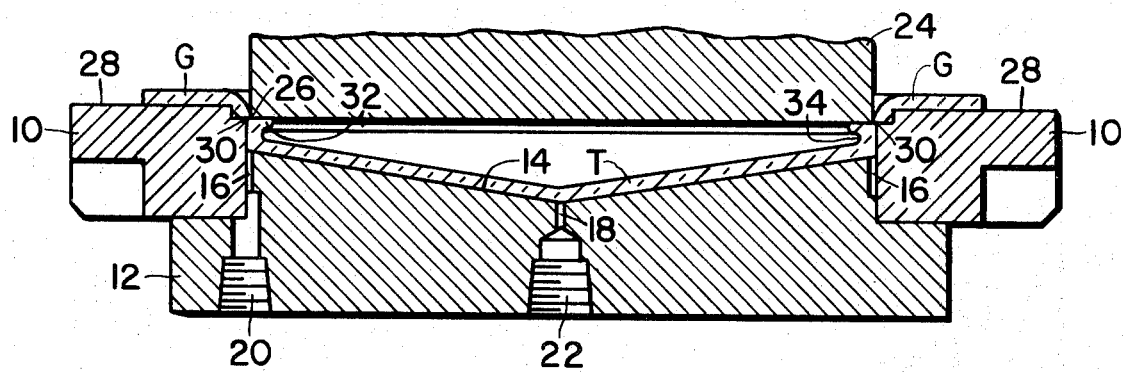

Referring now to the drawings, and particularly FIGS. 1, 2 and 3, a preferred method is shown of forming vitreous tile embodying the integral reentrant locking flange of the present invention. A sheet of heat-softened glass G is applied so as to overlie both the cavity 14 and rim portion 10 of a female mold 12. The glass sheet G, when applied to the mold 12, is preferably in a molten or semi-molten condition so that it will readily deform to the contour of the cavity 14 upon the application of a vacuum through peripheral vacuum ports 16 and central vacuum port 18, which are connected to suitable sources of vacuum through threaded couplings 20 and 22 respectively.

Immediately after the article is vacuum formed, a male trimmer 24 having hardened trim edge portions 26 is lowered into initial engagement with the still heat-softened or thermal plastic vitreous sheet material G as shown in FIG. 2. The sheet glass G overlying the bounding surfaces of the mold cavity 14, rests upon an upper surface 28 of edge portions 10 which is elevated above the female trim edge 30 of the mold 12. As the male trimmer 24 moves downwardly it initially gathers that volume of glass between upper support surface 28 and trim edge 30, and simultaneously squeezes the glass downwardly and forces it radially inwardly as shown in FIG. 2. Upon completion of its downward travel, the trim edge 26 of the male trimmer 24 complements the peripheral trim edge 30 of the female mold 12 as shown in FIG. 3, and severs the newly formed vitreous tile article T from the surrounding glass sheet G. Simultaneously with the severing operation, the male trimmer forms the radially-inwardly extending integral peripheral locking flange 32 by forcing the excess sheared glass inwardly and providing an undercut locking recess 34 having a reverse angle. The male trimmer 24 is then withdrawn, the newly formed tile article T removed from the female mold 12, and the surrounding sheet G discarded.

Figure 5:
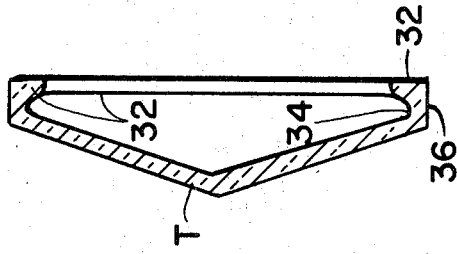
FIG. 5 is a cross-sectional view in elevation taken along line 5—5 of the tile shown in FIG. 4.
Figure 4:
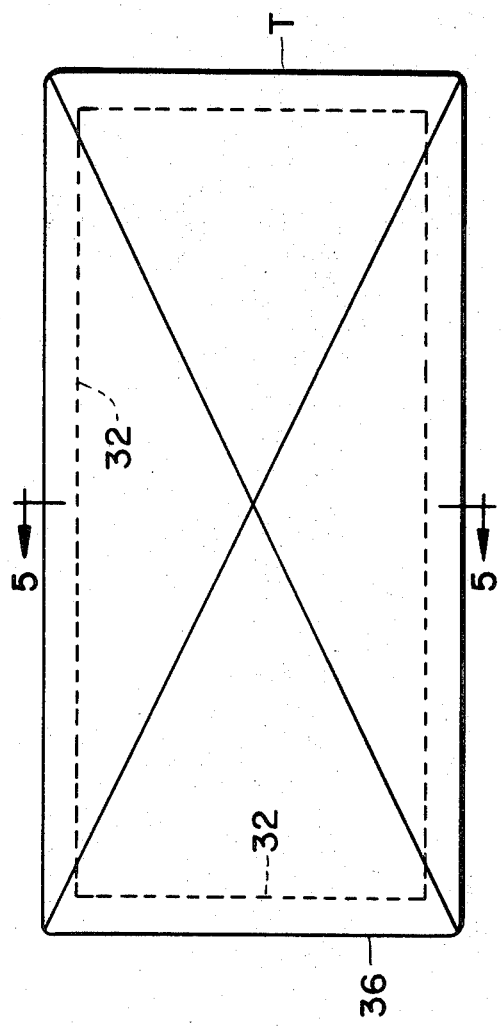
FIG. 4 is a top plan view of a nonporous vitreous cladding tile embodying the present invention.
Figure 6:
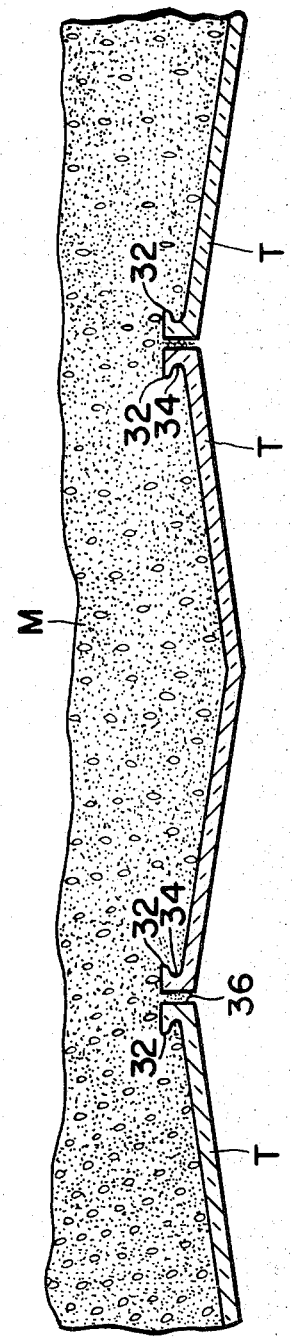
FIG. 6 is a fragmental horizontal cross-sectional view of a plurality of laid up tile members embodying the present invention securely held in place by the mechanical lock formed between the mortar and the integral locking flange having the undercut recess.

FIGS. 4 and 5 show a nonporous vitreous cladding tile embodying the present invention and formed in accordance with the procedure shown in FIGS. 1 through 3 inclusive. It will be appreciated, however, that although a shallow pyramidal exterior configuration is shown, any desired exterior configuration or texturing may be provided merely by appropriately contouring and finishing the cavity surface 14. As shown, the tile T is provided with sidewall portions 36 having a radially-inwardly extending peripheral locking flange 32 forming an undercut recess 34 with a reverse angle. As further shown in FIG. 6, the mortar or mud M utilized to lay up the tile T, provides a secure interfitting mechanical lock with the peripheral flange 32 and undercut recess 34 so as to securely retain the cladding tile in its laid up position.

Although the following specific example of one method of forming nonporous vitreous tile embodying the present invention with an integral locking flange having a recessed undercut, illustrates my now preferred method of so forming such tile, the example is by no means limiting in nature. A metal female mold and male trimmer were pre-heated to about 400° C. The female mold was provided with a cavity in the form of a rectangle of about 3 inches by 6 inches and about ¾ of an inch deep for forming a rectangular tile having a pyramidal face. A sheet of glass at a temperature of about 1250° C. was laid over the mold cavity and its bounding surface portions. The glass began sagging into the mold cavity and a vacuum of about 1 inch of mercury was immediately applied to complete the forming of the sheet to the contour of the cavity. Immediately thereafter, while the glass was still in its plastic state at a temperature of between about 900° C. and 1000° C., the male trimmer was brought down into contact with the glass to form the peripheral flange and its accompanying recess having a reverse angle, and simultaneously trim the newly formed tile from the surrounding glass sheet, as the trimmer edge of the male trimmer moved to its lowermost position adjacent the trimmer edge of the female mold. Since the glass is still in a semiplastic state during the trimming operation, the downward movement of the male trimmer initially flowed the excess gathered glass radially inwardly to form the peripheral flange with its recessed undercut and finally severed the article from the remaining glass sheet without producing fissures or cracking.

Since the amount of excess glass gathered by the trimmer as it moves downwardly between surface 28 and female trim edge 30 determines the size of the integral locking flange, it is possible to control the amount of undercut or reverse angle produced during the trimming operation by raising or lowering the female trim edge 30 with respect to the surface 28 upon which the vitreous sheet G is initially positioned. Therefore, if a larger undercut is desired, the female trim edge 30 is lowered from the surface 28 upon which the sheet G is positioned, so that when the male trimmer moves downwardly, it gathers more glass in that area between the upper surface and the female trim edge, and flows it inwardly thus producing a larger inwardly extending flange and accompanying undercut or recess. A smaller flange is, of course, produced by moving the surfaces closer together.

Although it will be appreciated that due to the reverse draft of the recess 34, the article T cannot readily be press-formed, as an alternative it would be possible to use a burn-off with a vacuum-formed article and produce a beaded edge which could provide some locking effect. However, since the bead would form around both the interior and exterior portion of the periphery, it would be necessary to machine the exterior portion of the bead in order to lay up a juxtapositioned tile.

Although I have disclosed the now preferred embodiments of my invention, it will be apparent to those skilled in the art that various modifications and ramifications may be made with respect thereto without departing from the spirit and scope thereof as defined in the appended claims.

I claim:

1. An improved method of forming nonporous vitreous cladding tile which comprises, vacuum-forming a thermal plastic sheet of nonporous vitreous material into a desired tile configuration, and while said vitreous material is still in a thermal plastic condition trimming said newly formed article from the surrounding sheet to form a radially-inwardly extending peripheral flange having an undercut recess.

2. A method of forming tile as defined in claim 1 including the steps of applying a sheet of molten glass over a cavity and bounding surfaces of an upwardly open-mold applying a vacuum to the cavity of such mold to conform the sheet thereover to the contour of such cavity, vertically displacing the sheet between the bounding surfaces and a peripheral trim edge of said mold cavity, and forcing said vertically displaced glass downwardly and inwardly to form an integral peripheral locking flange as the newly formed article is sheared from the glass sheet.

3. A method as defined in claim 1 wherein the vacuum-formed sheet is vertically displaced between an upper supporting surface and a peripheral trim edge about the mold cavity, and varying the amount of such vertical displacement to proportionately vary the size of the radially-inwardly extending peripheral flange.

4. A method as defined in claim 1 including the steps of applying a thermal plastic sheet of vitreous material over a cavity and bounding surface portions of an upwardly-open mold, vacuum forming such sheet to the contour of said cavity, vertically extending such sheet between the bounding surface portions and a female trim edge about the periphery of said cavity, downwardly and inwardly displacing the vertically extending sheet to form a radially-inwardly extending flange portion about said vacuum-formed article, and simultaneously sheering said article from the remainder of said sheet.

5. A method of forming tile as defined in claim 4 including the step of adjusting the length of vertically extending glass so as to correspondingly adjust the size of the radially-inwardly extending peripheral flange.

References Cited

UNITED STATES PATENTS

| 2,333,076 | 10/1943 | Stewart | 65—67 |
| 3,011,212 | 12/1961 | S. Marshall et al. | 264—90 |
| 3,041,669 | 7/1962 | W. Marshall et al. | 18—19 |

S. LEON BASHORE, Primary Examiner

S. R. FRIEDMAN, Assistant Examiner

U.S. Cl. X.R.

18—5, 19; 65—106, 286; 264—90